(12) United States Patent
Bender

(10) Patent No.: US 9,387,743 B2
(45) Date of Patent: Jul. 12, 2016

(54) SLIDE LOCK ATTACHMENT SYSTEM

(71) Applicant: Taylor Made Group, LLC, Gloversville, NY (US)

(72) Inventor: Thomas J. Bender, Fort Wayne, IN (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 14/132,588

(22) Filed: Dec. 18, 2013

(65) Prior Publication Data

US 2015/0165876 A1 Jun. 18, 2015

(51) Int. Cl.
*B60J 1/00* (2006.01)
*B60J 1/08* (2006.01)
*B60J 10/08* (2006.01)
*B60J 10/00* (2016.01)

(52) U.S. Cl.
CPC . *B60J 1/006* (2013.01); *B60J 1/004* (2013.01); *B60J 1/08* (2013.01); *B60J 10/0062* (2013.01); *B60J 10/081* (2013.01); *Y10T 29/49785* (2015.01)

(58) Field of Classification Search
CPC .......... B60J 10/0062; B60J 1/004; B60J 1/08; B60J 10/081

USPC .................... 296/201, 187.03, 192
See application file for complete search history.

(56) References Cited

U.S. PATENT DOCUMENTS

| 5,716,155 | A | * | 2/1998 | Yoshida et al. | ............... 403/187 |
| 7,140,079 | B2 | * | 11/2006 | Nishimura et al. | ............. 24/289 |
| 7,293,823 | B2 | * | 11/2007 | Chen et al. | ............... 296/203.03 |
| 7,533,998 | B2 | * | 5/2009 | Schofield et al. | ............. 359/844 |

\* cited by examiner

*Primary Examiner* — Joseph D Pape
*Assistant Examiner* — Dana Ivey
(74) *Attorney, Agent, or Firm* — Nixon & Vanderhye P.C.

(57) ABSTRACT

An attachment system connects an object such as a windshield to a vehicle pillar. The attachment system includes a front extrusion connectable to the vehicle pillar and including a connecting member, and a mating extrusion connectable to the vehicle pillar and including a coupling member cooperable with the connecting member. A pocket is machined into one of the front extrusion and the mating extrusion, and a latch is coupled with the other of the front extrusion and the mating extrusion. The front extrusion and the mating extrusion are connectable in an unlocked position and a locked position, wherein in the unlocked position, the connecting member is engaged with the coupling member with the latch displaced from the pocket, and in the locked position, the connecting member is engaged with the coupling member with the latch in alignment and engaged with the pocket.

17 Claims, 4 Drawing Sheets

SLIDE LOCK ATTACHMENT SYSTEM

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND OF THE INVENTION

The invention relates to a pillar attachment system and, more particularly, to a slide lock vehicle pillar attachment system providing for easy installation and removal.

In vehicle terms, vehicle pillars are structural members that support passenger compartment components and serve to protect occupants in a roll-over incident. The A-pillar, for example, is the first pillar of the passenger compartment, usually supporting the windshield.

Installing and removing a windshield can be difficult and time-consuming. Typical attaching structure utilizes an adhesive, which can be difficult to work with and makes for difficult removal if removal becomes necessary or desirable. Other means of attachment may include brackets and hardware, which require the use of hand tools for both attachment and removal. With these assemblies, there is potential for losing parts. Still further, these existing designs may require that two people be available to attach or detach the windshield.

BRIEF SUMMARY OF THE INVENTION

It would be desirable to provide an attachment system that allows for quick and easy installation and removal of a vehicle windshield or other mountable items.

Generally, the attachment system of the described embodiments includes two mating extrusions that are designed and machined to interlock and slide together onto a vehicle pillar. The extrusions include a series of interlocking tongues and grooves, with one extrusion having one or more tongues, and the other extrusion having one or more grooves. An additional pocket is machined into the extrusion with tongues, and a spring-loaded latch is secured to the extrusion with grooves that is cooperable with the pocket. A typical windshield would have two sets of extrusions, with one set mounted at each end of the windshield. When the extrusions are interlocked and slid into their final position on the pillar, the latch engages the pocket and locks the extrusions together. The extrusions can be unlocked and removed from the pillar by releasing the latch.

In an exemplary embodiment, an attachment system connects an object to a vehicle pillar. The attachment system includes a front extrusion connectable to the vehicle pillar and including a connecting tongue or groove, and a mating extrusion connectable to the vehicle pillar and to the front extrusion and including a connecting groove or tongue that is engageable with the connecting tongue or groove of the front extrusion, respectively. A pocket is machined into one of the front extrusion and the mating extrusion, and a latch coupled with the other of the front extrusion and the mating extrusion is engageable with the pocket when the front extrusion and the mating extrusion are oriented in a locked position.

Preferably, the pocket is machined into the one of the front extrusion and the mating extrusion that includes the connecting tongue.

The front extrusion and the mating extrusion may be cooperable between an unlocked position and the locked position, where in the unlocked position, the connecting tongue or groove of the front extrusion is engaged with the corresponding groove or tongue of the mating extrusion with the latch displaced from the pocket; and in the locked position, the connecting tongue or groove of the front extrusion is engaged with the connecting groove or tongue of the mating extrusion with the latch in alignment and engaged with the pocket. The latch may be biased closed by a spring, and the latch may be configured to automatically lock into the pocket when the mating extrusion is slid from the unlocked position to the locked position. In one orientation, the front extrusion includes the connecting tongue, and the mating extrusion comprises the connecting groove.

The object may be a vehicle windshield, where the front extrusion has a groove that receives the windshield.

The front extrusion may be snapped onto the pillar. The front extrusion and the mating extrusion may be formed of aluminum.

In another exemplary embodiment, an attachment system connects an object to a vehicle pillar. The attachment system includes a front extrusion connectable to the vehicle pillar, wherein the front extrusion includes a connecting member, and a mating extrusion connectable to the vehicle pillar and to the front extrusion, wherein the mating extrusion includes a coupling member cooperable with the connecting member of the front extrusion. A pocket is machined into one of the front extrusion and the mating extrusion, and a latch is coupled with the other of the front extrusion and the mating extrusion. The front extrusion and the mating extrusion are connectable in an unlocked position and a locked position, wherein in the unlocked position, the connecting member is engaged with the coupling member with the latch displaced from the pocket, and in the locked position, the connecting member is engaged with the coupling member with the latch in alignment and engaged with the pocket.

In yet another exemplary embodiment, a method for connecting an attachment system to a vehicle pillar includes the steps of securing a front extrusion to the vehicle pillar; connecting a mating extrusion the vehicle pillar and to the front extrusion, the front extrusion and the mating extrusion being connected in an unlocked position; and sliding the mating extrusion relative to the front extrusion into a locked position wherein a latch coupled with one of the front extrusion and the mating extrusion engages a pocket machined into the other of the front extrusion and the mating extrusion. The securing step may be practiced by snapping the front extrusion into engagement with the vehicle pillar. The sliding step may include automatically locking the latch into the pocket when the mating extrusion is slid from the unlocked position to the locked position.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
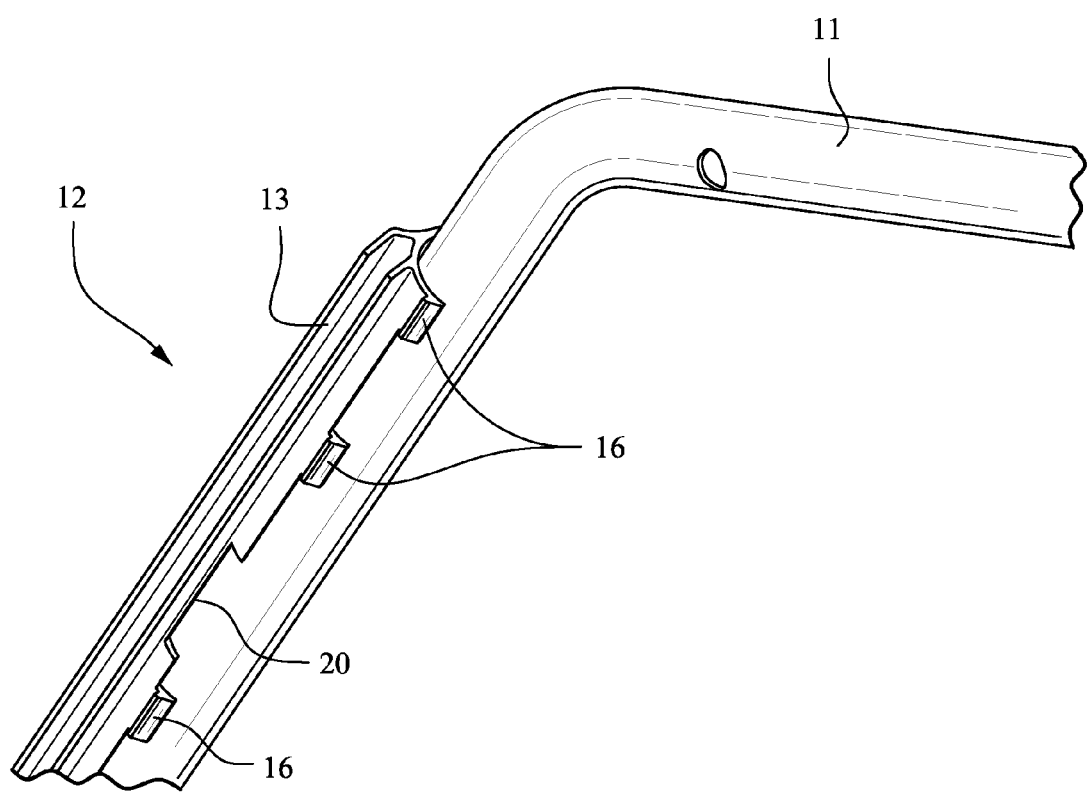
FIG. 1 shows the vehicle pillar with a front extrusion attached.
Figure 2:
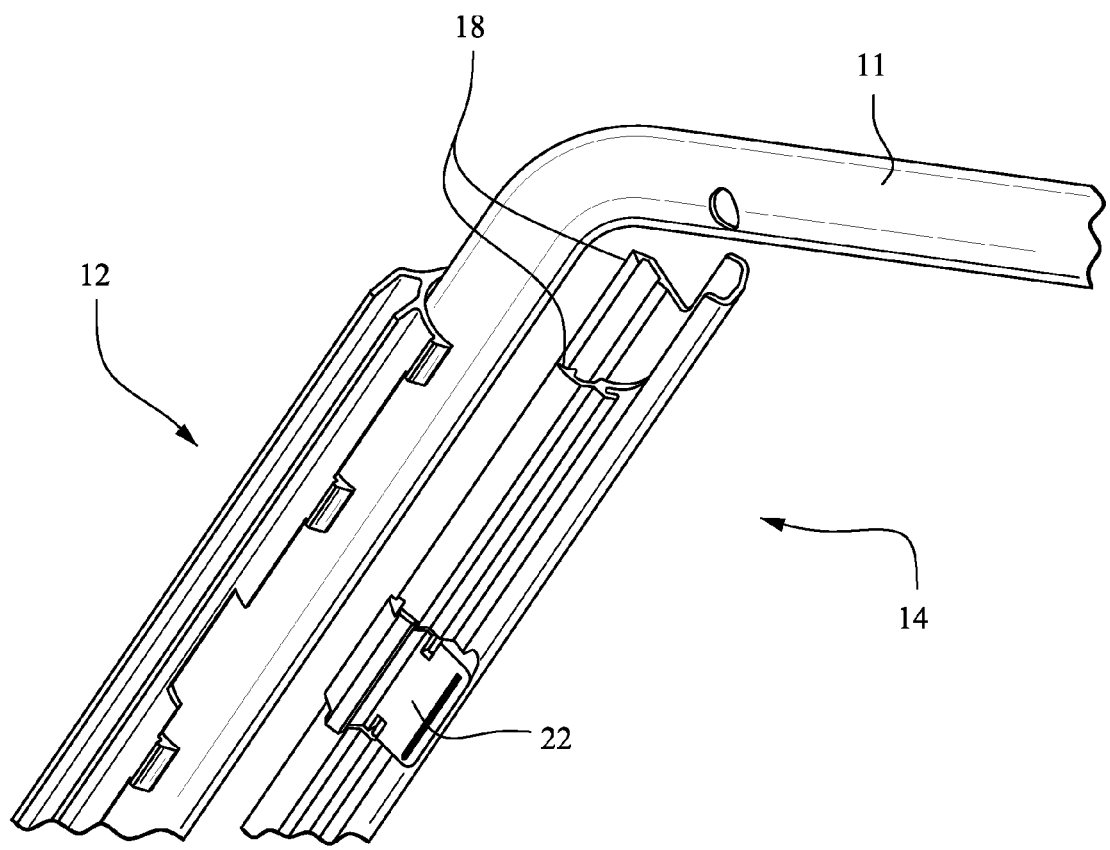
FIG. 2 shows the mating extrusion in position to engage the front extrusion.

With reference to the drawings, the attachment system is shown attached to a vehicle A pillar 11 for mounting a vehicle windshield. The construction, however, is suitable for any pillar and is not necessarily meant to be limited to the described exemplary application. The attachment system may be suitable for mounting items other than a windshield such as, for example, retention straps, hinges, brackets, shocks, handles, etc.

The attachment system includes a front extrusion 12 and a mating extrusion 14. The front extrusion 12 is shown with a groove 13 for securing a windshield. The extrusions 12, 14 are preferably formed of aluminum and include one or a series of interlocking tongues and grooves, with one extrusion having one or more tongues, and the other extrusion having one or more grooves. In the exemplary configuration shown in the drawings, the front extrusion 12 includes a plurality of tongues 16, and the mating extrusion 14 includes a plurality of grooves 18. The tongues 16 and grooves 18 are formed with the initial extrusion as part of the extrusion geometry. Additional geometry for alignment and locking is machined into the extrusions. Preferably, prior to assembly, the machined extrusions are cleaned and powder coated to eliminate possible galling and corrosion and to increase sliding lubricity.

A pocket 20 is machined into one of the front extrusion 12 and the mating extrusion 14, and a spring-loaded latch 22 is coupled with the other of the front extrusion 12 and the mating extrusion 14. Preferably, the pocket 20 is machined into the extrusion with the tongues 16. In the exemplary embodiment shown in the drawings, the front extrusion 12 includes the tongues 16 and the pocket 20. The spring-loaded latch 22 is accommodated in a channel machined into the other extrusion, which in the embodiment shown in the drawings is the mating extrusion 14.

Figure 3:
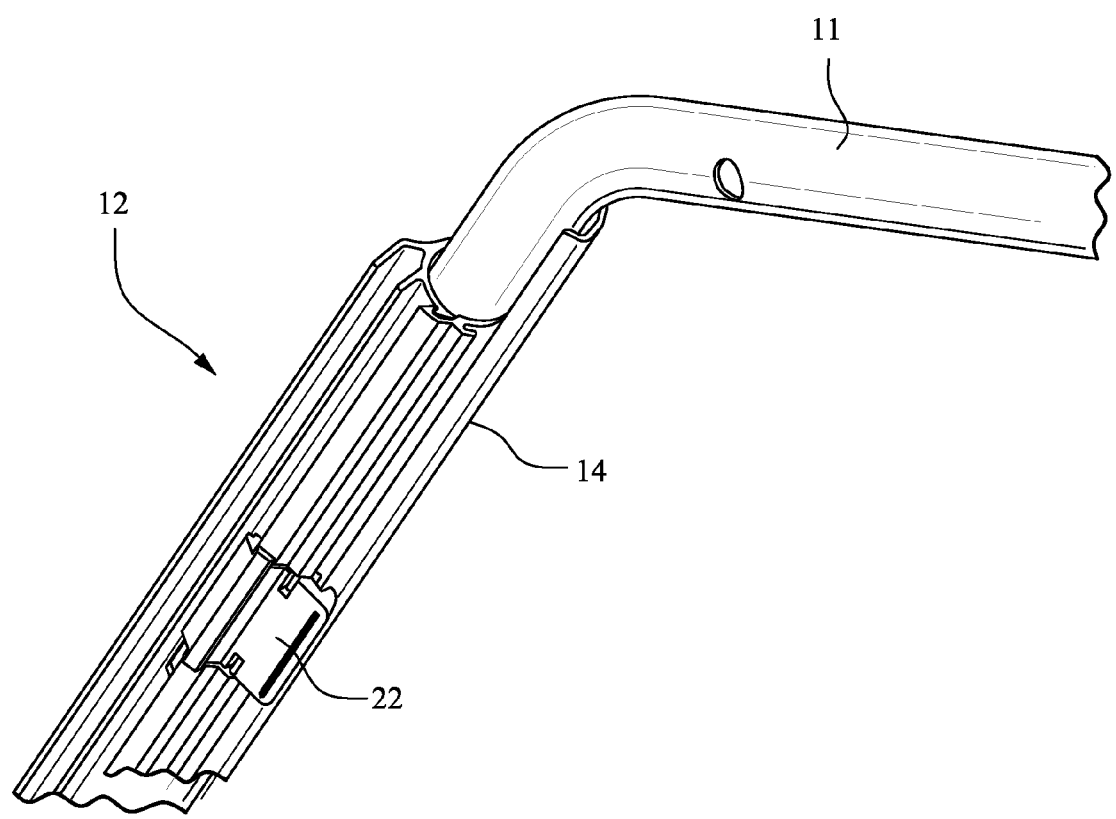
FIG. 3 shows the mating extrusion fully seated with the front extrusion in the unlocked position.
Figure 4:
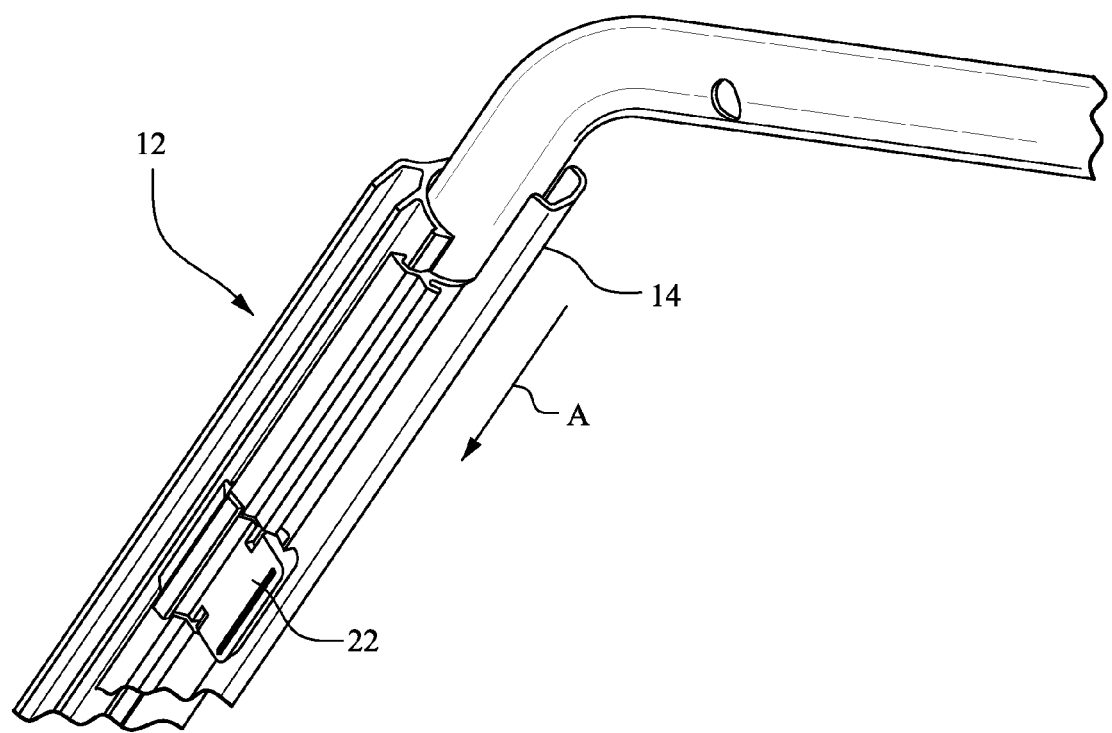
FIG. 4 shows the mating extrusion slid into the locked position.

With reference to FIGS. 3 and 4, in order to secure the attachment assembly to the vehicle pillar 11, the front extrusion 12 is first connected with the vehicle pillar 11. In a preferred arrangement, the front extrusion 12 is fixed onto the pillar 11. The front extrusion 12 may be permanently fixed onto the pillar 11 or alternatively may be snapped or the like onto the pillar 11. The mating extrusion 14 is brought into engagement with the front extrusion 12. In the exemplary embodiment shown in FIGS. 3 and 4, the grooves 18 of the mating extrusion are slid into engagement with the tongues 16 of the front extrusion 12. See, for example, FIG. 3.

FIG. 3 shows the front extrusion 12 and the mating extrusion 14 engaged in the unlocked position. In this position, the spring-loaded latch 22 is displaced from the pocket 20 and is disengaged. Once the mating extrusion 14 is fully seated in engagement with the front extrusion 12, the mating extrusion 14 is displaced relative to the front extrusion 12. In the exemplary embodiment shown in FIG. 4, the mating extrusion 14 is slid downward in the direction of arrow A until the latch 22 engages the pocket 20 in the front extrusion 12. In this position, the latch 22 is in alignment and engaged with the pocket 20. The latch 22 is biased closed by a spring. As such, the latch automatically locks into the pocket 20 when the mating extrusion 14 is slid from the unlocked position (FIG. 3) to the locked position (FIG. 4). The latch 22 serves to lock the extrusions 12, 14 together.

In order to release the extrusions, an opposite sequence is conducted, where the latch 22 is depressed, and the mating extrusion 14 is slid upward (i.e., upward in FIG. 4) back to the unlocked position shown in FIG. 3. In this position, the mating extrusion 14 can be removed from engagement with the front extrusion 12. That is, once the tongues and grooves are aligned, the mating extrusion can be pulled away from the front extrusion.

With the attachment system of the described embodiments, a vehicle windshield or other object for mounting to a vehicle or the like can be easily installed and removed from a pillar. The structure overcomes the drawbacks of existing attachment systems using adhesives that are more difficult to install and are not readily removable.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An attachment system that connects an object to a vehicle pillar, the attachment system comprising:
   a front extrusion connectable to one side of the vehicle pillar, the front extrusion including a connecting tongue or groove;
   a mating extrusion connectable to an opposite side of the vehicle pillar and to the front extrusion such that the front extrusion and the mating extrusion are connectable to surround the vehicle pillar, the mating extrusion including a connecting groove or tongue that is engageable with the connecting tongue or groove of the front extrusion, respectively;
   a pocket machined into one of the front extrusion and the mating extrusion; and
   a latch coupled with the other of the front extrusion and the mating extrusion and engageable with the pocket when the front extrusion and the mating extrusion are oriented in a locked position.

2. An attachment system according to claim 1, wherein the pocket is machined into the one of the front extrusion and the mating extrusion that includes the connecting tongue.

3. An attachment system according to claim 1, wherein the front extrusion and the mating extrusion are cooperable between an unlocked position and the locked position, wherein in the unlocked position, the connecting tongue or groove of the front extrusion is engaged with the corresponding groove or tongue of the mating extrusion with the latch displaced from the pocket, and in the locked position, the connecting tongue or groove of the front extrusion is engaged with the connecting groove or tongue of the mating extrusion with the latch in alignment and engaged with the pocket.

4. An attachment system according to claim 3, wherein the latch is biased closed by a spring, and wherein the latch is configured to automatically lock into the pocket when the mating extrusion is slid from the unlocked position to the locked position.

5. An attachment system according to claim 3, wherein the front extrusion comprises the connecting tongue, and wherein the mating extrusion comprises the connecting groove.

6. An attachment system according to claim 1, wherein the object is a vehicle windshield, and wherein the front extrusion comprises a groove that receives the windshield.

7. An attachment system according to claim 1, wherein the latch is biased closed by a spring.

8. An attachment system according to claim 1, wherein the front extrusion is snapped onto the pillar.

9. An attachment system according to claim 1, wherein the front extrusion and the mating extrusion are formed of aluminum.

10. An attachment system that connects an object to a vehicle pillar, the attachment system comprising:
- a front extrusion connectable to one side of the vehicle pillar, the front extrusion including a connecting member;
- a mating extrusion connectable to an opposite side of the vehicle pillar and to the front extrusion, the mating extrusion including a coupling member cooperable with the connecting member of the front extrusion, wherein the front extrusion and the mating extrusion are connectable completely around the vehicle pillar;
- a pocket machined into one of the front extrusion and the mating extrusion; and
- a latch coupled with the other of the front extrusion and the mating extrusion,
- wherein the front extrusion and the mating extrusion are connectable in an unlocked position and a locked position, wherein in the unlocked position, the connecting member is engaged with the coupling member with the latch displaced from the pocket, and in the locked position, the connecting member is engaged with the coupling member with the latch in alignment and engaged with the pocket.

11. An attachment system according to claim 10, wherein the latch is biased closed by a spring, and wherein the latch is configured to automatically lock into the pocket when the mating extrusion is slid from the unlocked position to the locked position.

12. An attachment system according to claim 10, wherein the object is a vehicle windshield, and wherein the front extrusion comprises a groove that receives the windshield.

13. An attachment system according to claim 10, wherein the front extrusion is snapped onto the pillar.

14. An attachment system according to claim 10, wherein the front extrusion and the mating extrusion are formed of aluminum.

15. A method for connecting an attachment system to a vehicle pillar, the method comprising:
- securing a front extrusion to one side of the vehicle pillar;
- connecting a mating extrusion to an opposite side of the vehicle pillar and to the front extrusion with the vehicle pillar interposed between the front extrusion and the mating extrusion, the front extrusion and the mating extrusion being connected in an unlocked position; and
- sliding the mating extrusion relative to the front extrusion into a locked position wherein a latch coupled with one of the front extrusion and the mating extrusion engages a pocket machined into the other of the front extrusion and the mating extrusion.

16. A method according to claim 15, wherein the securing step is practiced by snapping the front extrusion into engagement with the vehicle pillar.

17. A method according to claim 15, wherein the latch is biased closed by a spring, and wherein the sliding step comprises automatically locking the latch into the pocket when the mating extrusion is slid from the unlocked position to the locked position.

\* \* \* \* \*